United States Patent
Pauly et al.

(10) Patent No.: US 8,838,039 B2
(45) Date of Patent: Sep. 16, 2014

(54) DEVICE FOR CONTROLLING THE OPERATION OF A RADIOCOMMUNICATION ELECTRONIC MODULE, AND CORRESPONDING ELECTRONIC CIRCUIT

(75) Inventors: Frédéric Pauly, Triel sur Seine (FR); Chieng Kieng Du, Saint Maur des Fosses (FR)

(73) Assignee: Sierra Wireless, Issy-les-Moulineaux (FR)

( * ) Notice: Subject to any disclaimer, the term of this patent is extended or adjusted under 35 U.S.C. 154(b) by 903 days.

(21) Appl. No.: 12/746,028

(22) PCT Filed: Dec. 1, 2008

(86) PCT No.: PCT/EP2008/066515
§ 371 (c)(1),
(2), (4) Date: Sep. 3, 2010

(87) PCT Pub. No.: WO2009/071505
PCT Pub. Date: Jun. 11, 2009

(65) Prior Publication Data
US 2011/0021159 A1 Jan. 27, 2011

(30) Foreign Application Priority Data
Dec. 3, 2007 (FR) .................................. 07 59523

(51) Int. Cl.
*H04W 4/00* (2009.01)
*H04W 52/02* (2009.01)

(52) U.S. Cl.
CPC .................................. *H04W 52/028* (2013.01)
USPC .......................................... 455/68; 370/328

(58) Field of Classification Search
USPC ........................................... 370/328; 455/68
See application file for complete search history.

(56) References Cited

U.S. PATENT DOCUMENTS

| | | | | |
|---|---|---|---|---|
| 4,119,896 A | * | 10/1978 | Estes et al. | 318/266 |
| 4,137,500 A | * | 1/1979 | Weber | 375/286 |
| 4,384,361 A | | 5/1983 | Masaki | |
| 5,566,322 A | * | 10/1996 | Pechonis et al. | 711/154 |
| 5,682,888 A | * | 11/1997 | Olson et al. | 600/436 |
| 5,731,731 A | * | 3/1998 | Wilcox et al. | 327/403 |
| 5,825,160 A | * | 10/1998 | Kim | 320/134 |
| 2002/0100814 A1 | * | 8/2002 | Pollak et al. | 239/63 |
| 2003/0028300 A1 | | 2/2003 | Stangl | |
| 2003/0090303 A1 | * | 5/2003 | Kimura et al. | 327/115 |
| 2006/0135262 A1 | * | 6/2006 | Kennedy et al. | 463/42 |
| 2006/0184288 A1 | * | 8/2006 | Rodgers | 700/295 |

OTHER PUBLICATIONS

French Search Report dated May 22, 2008 for corresponding French Application No. FR0759523, filed Dec. 3, 2007.
International Preliminary Report on Patentability and Written Opinion dated Jun. 29, 2010 for corresponding International Application No. PCT/EP2008/066515, filed Dec. 1, 2008.
International Search Report dated, Mar. 12, 2009 for corresponding International Application No. PCT/EP2008/066515, filed Dec. 1, 2008.

* cited by examiner

Primary Examiner — Yuwen Pan
Assistant Examiner — Mark Woodall
(74) Attorney, Agent, or Firm — David D. Brush; Westman, Champlin & Koehler, P.A.

(57) ABSTRACT

A device is provided for controlling operation of a radiocommunication electronic module using a control signal. The device includes a circuit for switching the control signal between a high logic state and a low logic state or vice versa, and a circuit for controlling the switching circuit. The control circuit generates a control signal. The module includes an activation input receiving the control signal. The control circuit includes: a first input receiving a first signal representative of a supply voltage; and a second input receiving a second signal from the module.

19 Claims, 3 Drawing Sheets

DEVICE FOR CONTROLLING THE OPERATION OF A RADIOCOMMUNICATION ELECTRONIC MODULE, AND CORRESPONDING ELECTRONIC CIRCUIT

CROSS-REFERENCE TO RELATED APPLICATIONS

This application is a Section 371 National Stage Application of International Application No. PCT/EP2008/066515, filed Dec. 1, 2008 and published as WO 2009/071505 on Jun. 11, 2009, not in English.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The field of the disclosure is that of radiocommunications and more particularly of radiocommunication devices comprising a radiocommunication electronic module.

More precisely, the disclosure concerns the controlling of the operation of such modules by means of a control signal.

The disclosure applies in particular, but not exclusively, in the case where the radiocommunication electronic module is, for example, a module of the "WISMO" (registered trademark) family of the WAVECOM company (applicant of this patent application). The WAVECOM company has indeed for several years now proposed an approach that overcomes a certain number of disadvantages by grouping into a single module (called radiocommunication electronic module), all or at least most of the functions of a digital radiocommunication device. Such a module has the form of a single case, preferentially shielded, that the manufacturers of devices can implant directly, without having to take a multitude of components into account. This module (still sometimes called "macro component") is indeed formed of a grouping of several components on a substrate, in such a way as to be implanted in the form of a single element. It comprises the essential components (in particular a processor, memories, and software) that are required for the operation of a radiocommunication device using radio frequencies. There are therefore no longer any complex steps in creating the design, or in validating the latter. It is sufficient to reserve the required space in the module. Such a module thus makes it possible to easily incorporate, rapidly and in an optimised way, all of the components into wireless terminals (mobile telephones, modems, or any other device making use of a wireless standard).

The aforementioned radiocommunication module is compliant with a radiocommunication standard such as in particular, but not exclusively, GSM ("Global System for Mobile"), GPRS ("Global Packet Radio Service"), UMTS ("Universal Mobile Telecommunications Service"), WCDMA ("Wideband Code Division Multiple Access"), WiFi ("Wireless Fidelity"), the Bluetooth, Zigbee, Wi-Max, etc. standard.

The disclosure in particular has applications in the field of M2M ("machine to machine"), where the machines include radiocommunication devices in order to communicate with each other and/or with one or several pieces of equipment (typically a server).

As such, the disclosure applies in particular, but not exclusively, to remote data reading systems, for example weather stations, water, gas or electricity meters, and more generally to monitoring or telemetry systems, wherein each measuring (water meter for example) or distribution (beverage distributor for example) equipment is provided with a radiocommunication device in order to communicate with one or several management servers.

BACKGROUND OF THE DISCLOSURE

Solely for the purposes of illustration, the disadvantages of prior art are presented hereinafter in the case where the radiocommunication electronic module is, for example, a module of the "WISMO" (registered trademark) family implementing the "Open AT" (registered trademark) concept of the WAVECOM company (applicant of this patent application). It is clear that these disadvantages can be transposed to any other type of radiocommunication module.

Conventionally, a radiocommunication module comprises a hardware architecture ("hardware") and software architecture ("software").

The software architecture comprises a radiocommunication software stack supporting the execution capacity of at least one client application (for example an "Open AT" application), i.e. third-party code in comparison with the code of the main radiocommunication application (firmware) which manages the radiocommunication software stack (GSM stack for example).

As we shall see hereinafter, it is conventional to turn off a radiocommunication software stack with AT commands ("GSM AT Commands Task"), for example of the "AT+COPF" type. These AT commands can be issued by a device that is exterior to the radiocommunication module (i.e. "Open AT" concept) or by the radiocommunication module itself (AT commands internal to the module).

Generally, the radiocommunication module receives a control signal on an "ON/OFF" activation input. The control signal varies between high and low logic states. For example, the module is activated when the control signal is at the high logic state. However, it is deactivated when the control signal is at the low logic state.

The radiocommunication module comprises a real time clock (or "RTC") (also called means of alerting in what follows) making it possible to wake up the module at determined instants. This real time clock is supplied by a source of power that is separate from that of the module, for example, a dedicated battery. As such, when the module is off, the real time clock continues to operate. The "alarm mode" refers to the operating mode of the radiocommunication module wherein only the real time clock is active. To place the radiocommunication module in the alarm mode, the radiocommunication module must be off, i.e. a low logic state must be applied on the "ON/OFF" activation input of the module.

Several techniques for controlling radiocommunication modules are already known. Generally, it is in particular sought to reconcile at least some of the following objectives:
 effectiveness of the control, the module having to be deactivated from a hardware as well as a software standpoint, in such a way as to minimize the electric consumption of the module when it is not used;
 simplicity of the manipulations for activating and deactivating the module, with the user having to be able to carry out these operations with a reduced number of operations, and each of these operations having to be the easiest possible;

simplicity and low cost for implementing.

In all of the figures in this document, identical elements or signals are designated by the same alphanumeric reference.

In relation with FIG. 1a, a conventional diagram for activating a radiocommunication module is shown.

Conventionally, the ON/OFF activation input of the radiocommunication module 1000 is directly connected to the VBATT supply of the radiocommunication device. In this conventional connection scheme, the radiocommunication module is never physically off, in that the hardware portion of the module is always supplied. Of course, it is possible to place the radiocommunication module in a low consumption mode by deactivating the software portion of the module by means of AT commands. However, this remains insufficient. Indeed, the radiocommunication devices implementing this first known technique have a low autonomy. In other terms, this first known technique does not favour the use of batteries of small size and of low power. Moreover, with such a technique, it is not possible to program the real time clock, due to the fact that a low logic state is never applied on the "ON/OFF" activation input of the module.

A second known technique is based on the use of a manual command. The FIG. 1b shows a conventional diagram for controlling the operation of a radiocommunication module, by means of a manual command.

Conventionally, the manual command is carried out as desired by a user. For this, the device comprises a switch 2000 whereon the user can act to authorise or not authorise the input of the VBATT supply on the ON/OFF activation input of the module 1000. This second technique thus proposes to place a switch 2000 between the VBATT supply and the ON/OFF activation input of the module.

The inventors have observed that the current aforementioned technique has a certain number of disadvantages in certain situations.

Indeed, the ergonomics of this second known technique is limited by the fact that the user must, at the moment when the module is turned off, be physically within range of the device wherein the module is embedded. This technique therefore does not favour the mobility of the user. Furthermore, and in particular for the reason mentioned hereinabove, this second technique is poorly adapted for the particular case of telemetry using radiocommunication devices placed in the natural environment (ocean, desert, volcanic environment, etc.).

It is well known in prior art that a radiocommunication module has the possibility of being commanded automatically. The FIG. 1c shows a conventional diagram for controlling the operation of a radiocommunication module, by means of an automatic command.

This automatic command can for example be carried out by means of a microprocessor 3000 external to the module. The microprocessor 3000 cooperates with the switch 2000. More precisely, the microprocessor 3000 transmits at predetermined instants activation commands to the switch 2000, via a command signal S1. This command signal S1 thus makes it possible to authorise or not authorise the input of the VBATT supply on the ON/OFF activation input of the module 1000.

Although this method of automatic command represented considerable progress in the mechanism of controlling (activating/deactivating) a radiocommunication module, this method nevertheless has the disadvantage of requiring a microprocessor which takes up space and is expensive in terms of price and electric consumption.

SUMMARY

In a particular embodiment of the invention, a device is proposed for controlling the operation of a radiocommunication electronic module by means of a control signal, said device comprising means for switching said control signal between a high logic state and a low logic state, or vice versa, and means of commanding aid means for switching, said means for commanding generating as output a command signal, said module comprising an activation input receiving said control signal. The means for commanding include:
 a first input receiving a first signal representative of a supply voltage;
 a second input receiving a second signal coming from said module.

As such, an embodiment of the invention is based on an entirely new and inventive approach for the controlling of the operation of a radiocommunication module. Indeed, an embodiment of the invention proposes a self-adjusting control system. More precisely, it is proposed that a control signal according to two signals be generated, and in particular a signal coming from the module. In other terms, the logic state of the control signal depends on the logic states of the signals received by the means for commanding. The activating and the deactivating of the module are therefore controlled by the module itself. As such, it is possible to simply and effectively control the operation of a radiocommunication module, and this, contrary to the aforementioned technique of prior art, without using an external microprocessor that takes up space and that is expensive. On the contrary, an embodiment of the invention proposes to use all or a portion of the internal intelligence of the module to command the switching of the control signal.

Advantageously, said means of commanding include means for detecting a pulse, making it possible to block said means for switching as long as said means for detecting do not indicate that a pulse is received on at least one of said first and second inputs.

The means of commanding therefore make it possible to maintain the module in its current state (activated or deactivated), as long as a pulse is not detected.

Advantageously, said means for detecting include an OR logic gate receiving said first and second signals, and delivering said command signal.

According to an advantageous characteristic, said means for switching include:
 a latch receiving on a third input said control signal and delivering at the output said control signal;
 means of looping of the output of said latch towards a fourth input of said latch.

Advantageously, said means of looping include a first inverter.

Advantageously, the device further comprises means for generating a pulse using said first signal.

Advantageously, said means for generating include:
 means for slowing down said first signal, delivering a first slowed signal;
 means for comparing said first slowed signal with a determined threshold, said means for comparing delivering a pulse according to the result of the comparison.

The means for slowing down make it possible to increase the rise and fall times of the first signal. For example, the means for slowing down are formed by an RC circuit.

According to an advantageous characteristic, said means for comparing include a second inverter.

In another embodiment, the invention relates to an electronic circuit comprising a device for controlling such as described hereinabove.

In another embodiment, the invention relates to an assembly comprising a radiocommunication electronic module and a device for controlling such as described hereinabove.

BRIEF DESCRIPTION OF THE DRAWINGS

Other characteristics and advantages of embodiments of the invention shall appear when reading the following description, provided by way of a non-restricted and indicative example (all of the embodiments of the invention are not limited to the characteristics and advantages of the embodiments described hereinafter), and the annexed drawings, wherein:

FIG. 1a: the conventional diagram for activating a radiocommunication module;

FIG. 1b: the conventional diagram for controlling the operation of a radiocommunication module, by means of a manual command;

FIG. 1c: the conventional diagram for controlling the operation of a radiocommunication module, by means of an automatic command;

DETAILED DESCRIPTION OF ILLUSTRATIVE EMBODIMENTS

Figure 1A:
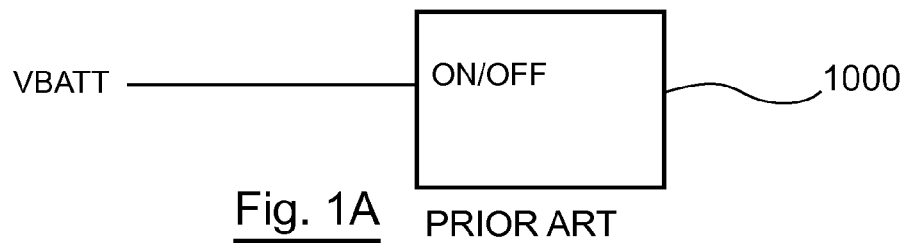
FIGS. 1a to 1c, which have already been commented on in relation with prior art, show.
Figure 1B:
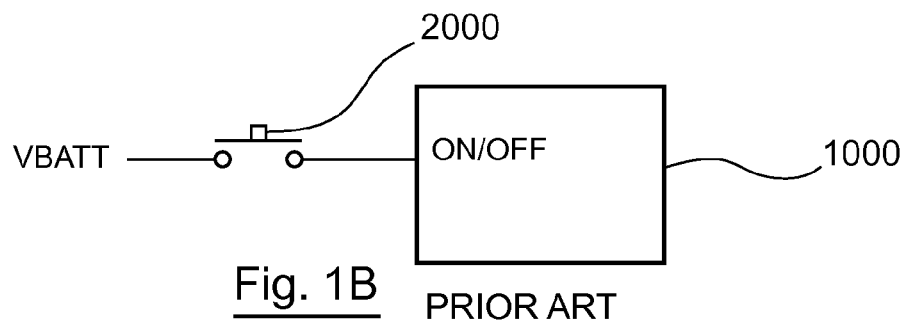
Figure 1C:
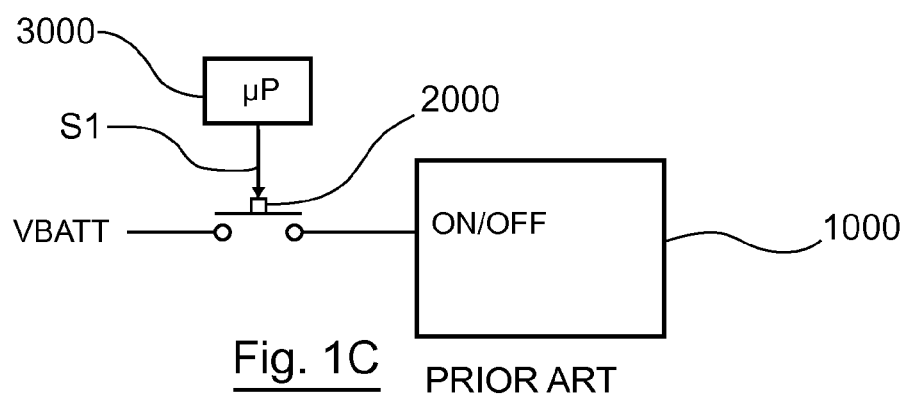
Figure 2:
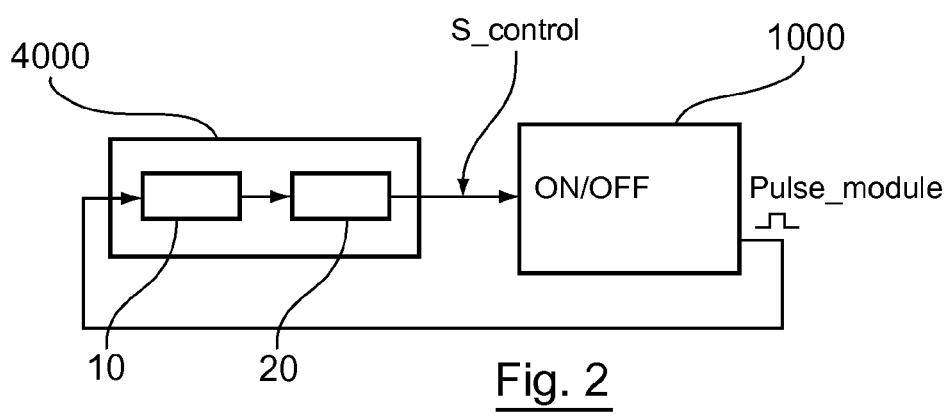
FIG. 2 shows the diagram for controlling the operation of a radiocommunication module, by means of a device for controlling according to a particular embodiment of the invention.

As shown in FIG. 2, the general principle of an embodiment of the invention is based on the generation (by a device for controlling 4000) of a control signal S_control using a signal Pulse_module issued by a radiocommunication module 1000.

According to an embodiment of the invention, means of commanding 10 receive the signal Pulse_module coming from the module, and where applicable, detect a pulse. These means of commanding 10 make it possible, after a positive detection of a pulse, to activate means for switching 20 making it possible to switch the control signal S_control from a low logic state to a high logic state, or vice versa.

Figure 3:
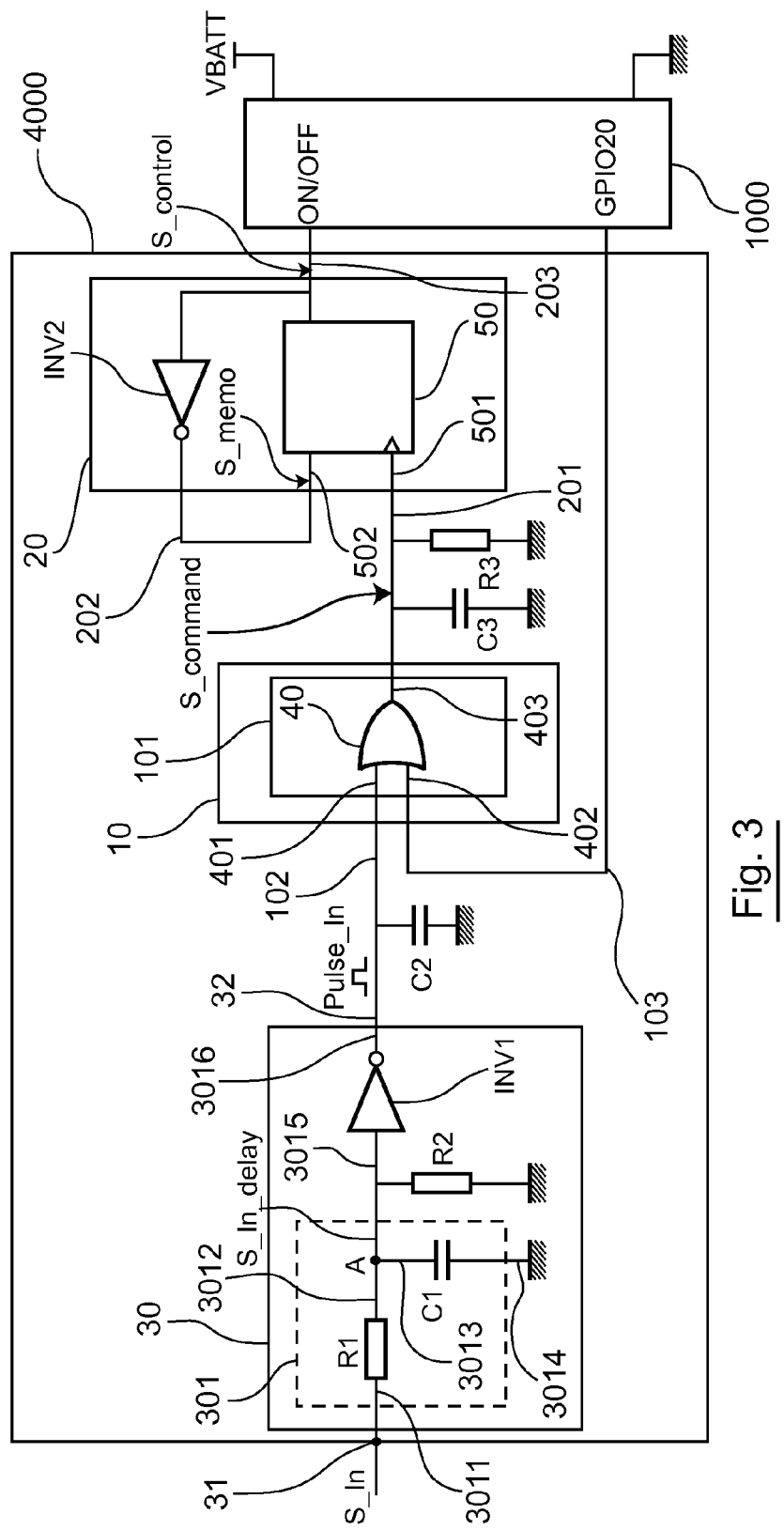
FIG. 3 shows the detailed diagram of the device for controlling in FIG. 2.

In relation with the FIG. 3, a device for controlling 4000 according to a particular embodiment of the invention shall now be described.

In this embodiment, the device for controlling 4000 comprises:
means for generating 30 a first pulse Pulse_In specific to an embodiment of the invention;
means for commanding 10 including means for detecting pulses 101 specific to an embodiment of the invention; and
means for switching 20 specific to an embodiment of the invention.

The means for generating 30 receive on an input 31 an input signal S_In which can be, for example, the supply voltage VBATT of the module, and delivers at the output 32 a first pulse Pulse_In.

More precisely, the means for generating 30 include means for slowing down 301 receiving the input signal S_In and delivering a slowed input signal S_In_delay. In a particular embodiment, the means for slowing down 301 include a resistor R1 of which a first end 3011 is connected to the input 31 and a second end 3012 to a midpoint A. The means for slowing down 301 further include a capacitor C1 of which a first end 3013 is connected to the midpoint A and a second end 3014 to the ground of the module. In response to a switching of the input signal S_In from the low logic state to the high logic state, the circuit R1C1 delivers at the midpoint A a slowed signal S_In_delay, in the sense where its rise (or fall) time is longer than that of the input signal S_In.

In such a way as to generate the first pulse Pulse_In using the slowed input signal S_In_delay, the means for generating 30 include an inverter Inv1. The input 3015 of the inverter Inv1 is connected to the midpoint A and its output 3016 is connected to the output 32. The inverter Inv1 has a switching threshold V_threshold. As such, when the level of the slowed input signal S_In_delay is less than or equal to the switching threshold V_threshold the inverter Inv1 delivers at the output 32 a high logic state. However, when the level of the slowed input signal S_In_delay is greater than the switching threshold V_threshold the inverter Inv1 delivers at the output 32 a low logic state. In this way, the means for generating 30 make it possible to generate a pulse Pulse_In (called first pulse in what follows) each time that the input signal S_In switches from the low logic state to the high logic state.

Note that the resistor R2, mounted between the input 3015 of the inverter Inv1 and the ground, is a resistor of the "pull-down" type which makes it possible to impose a low logic state on the input 3015 of the inverter Inv1, in such a way as to prevent the latter from being in an unstable state at the start up of the supply voltage VBATT of the module.

Note also that the capacitor C2, mounted between the output 3016 of the inverter Inv1 and the ground, makes it possible to suppress the parasite pulses that can be generated at the output of the inverter Inv1.

According to an advantageous aspect of the embodiment shown, the operation of the module 1000 is controlled by using pulses issued by the means for generating 30 and by the module itself. For this, means of commanding 10 are used mounted in series with the means for generating 30.

The means of commanding 10 include a first input 102 connected to the output 32 and a second input 103 connected to an output GPIO20 of the module 1000.

It is important to note that the radiocommunication modules, and in particular those of the "WISMO" (registered trademark) family, include one or several means for generating pulses making it possible to provide on outputs commonly known as "GPIO" (for "General Purpose Input/Output") pulses (noted as Pulse_module in the rest of the description), at predetermined instants. The inventors call your attention to the fact that such pulses are conventionally used for controlling electronic circuits that are external to the module (such as for example logic gates, memories, etc.), but have never been used for commanding the activation or the deactivation of the module itself.

As we shall see in the rest of the description, these means of commanding 10 include means for detecting pulses 101 making it possible to block the means for switching as long as they do not indicate that a pulse is received on one of the inputs 102 and 103 means of commanding 10.

In a particular embodiment, the means of commanding 10 include an OR logic gate 40 of which a first input 401 is connected to the input 102 and a second input 402 to the input 103. As such, the OR logic gate 40 is likely to receive on its first input 401 a first pulse Pulse_In (delivered at the output 32 of the means for generating 30) and on its second input 402 a second pulse Pulse_module (delivered at the output GPIO20 of the module 1000).

As described hereinafter, the OR logic gate 40 delivers at the output 403 a command signal S_command which takes the low logic value when no pulse is received on the inputs 102 and 103 and the high logic value when a first Pulse_In or second pulse Pulse_module is received.

Note that the resistor R3 and the capacitor C3, mounted between the output 403 and the ground, make it possible to suppress the parasite pulses that can be generated at the output of the OR logic gate 40.

The command signal S_command makes it possible to control the means for switching 20. These means for switching 20 receive on a first input 201 the command signal S_command and on a second input 202 a signal to be memorized S_memo, and deliver at the output 203 the control signal S_control.

In a particular embodiment, the means for switching 20 include a latch 50 of the D type of which the activation input 501 is connected to the first input 201 and the input for memorization 502 to the second input 202.

This latch 50, which is for example active on the rising edge, makes it possible to copy the signal to be memorized S_memo at the output 203 at each rising edge of the command signal S_command, and to maintain the control signal S_control at its current logic state until the next rising edge of the command signal S_command.

In this example of an embodiment, the signal to be memorized S_memo is none other than the reversed control signal. For this, the means for switching 20 further include an inverter Inv2 mounted between the output 203 and the entry for memorization 502 of the latch 50.

Figure 4:
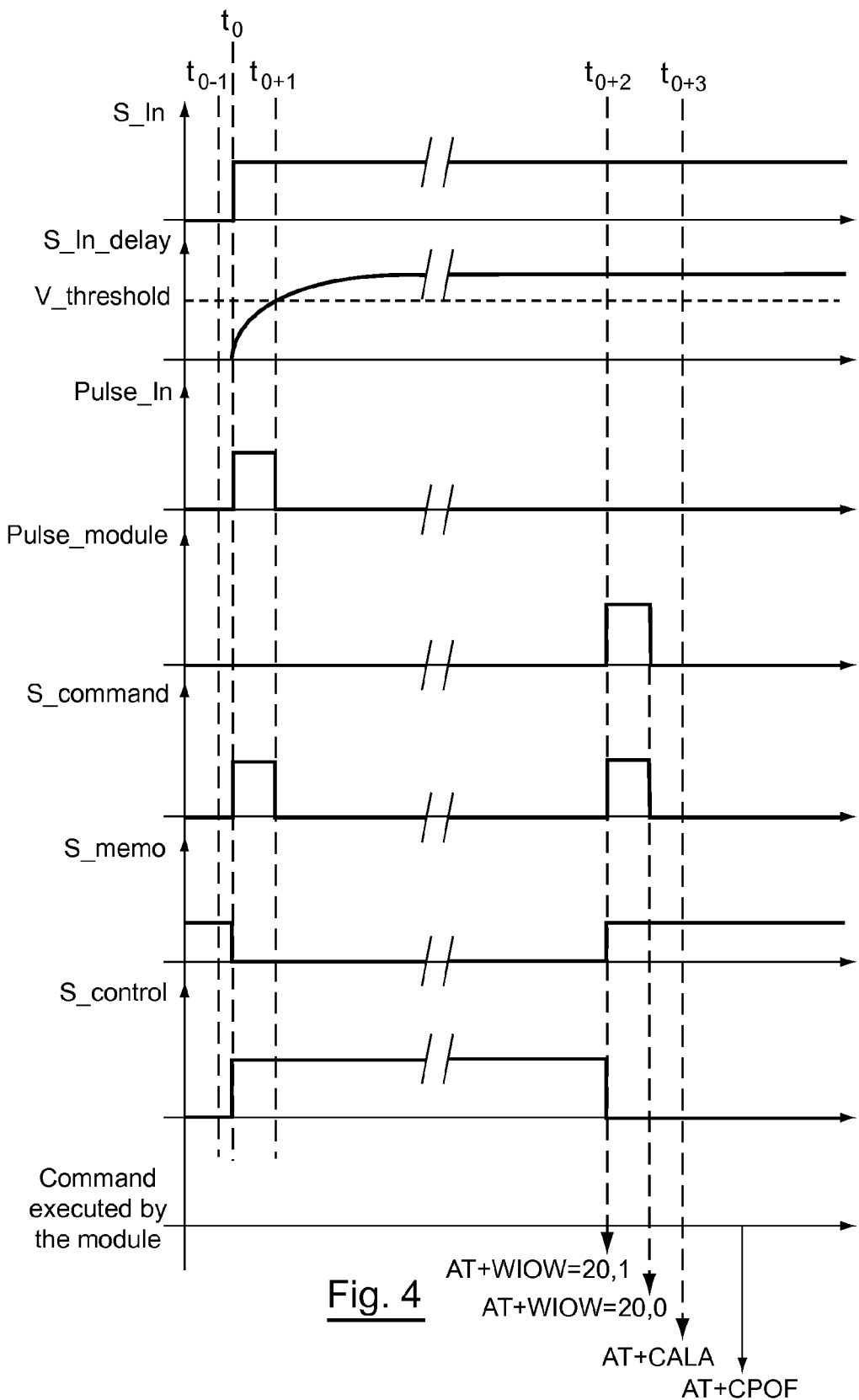
FIG. 4 shows the operation of the device for controlling in FIG. 3.

In relation with FIG. 4, the operation of the device for controlling 4000 shall now be described.

In the example described hereinafter, note that:
the instant t0 corresponds to a start up of the supply voltage VBATT of the module 1000;
the instant t0+1 corresponds to a start of operation in nominal mode of the module 1000;
the instant t0+2 corresponds to an end of operation in nominal mode of the module 1000; and
the instant t0+3 corresponds to a start of operation in alarm mode of the module 1000.

It is supposed that just before the instant t0 (i.e. at the instant t0−1), the device for controlling 4000 is in a stable state wherein the control signal S_control is at the low logic state and the signal to be memorized S_memo is at the high logic state.

At the instant t0, the input signal S_In switches from the low logic state to the high logic state. The capacitor C1 is loaded with the input signal S_In through the resistor R1. As such, in response to this switching of the input signal S_In, the circuit R1C1 delivers at the midpoint A a slowed input signal S_In_delay having a rise time that is longer than that of the input signal S_In. In this particular embodiment, the slowed input signal S_In_delay exponentially tends towards the high logic state. As long as the slowed input signal S_In_delay remains less than or equal to the switching threshold V_threshold of the inverter Inv1, the latter delivers at the output (Pulse_In) a high logic state. At this instant t0, the module 1000 delivers no second pulse (Pulse_module) at the output GPIO20. The OR logic gate 40, receiving a high logic state on its first input 401, provides a high logic state on the activation input 501 of the latch 50. The latch 50 is therefore activated. In an active state, the latch makes it possible to copy the signal to be memorized S_memo at the output 203, in other terms, it imposes as output 203 the preceding logic state of the signal to be memorized S_memo. As indicated hereinabove, at the instant t0−1 the signal to be memorized S_memo is at the high logic state. As such at the instant t0, the control signal S_control changes from the low logic state to the high logic state.

At the instant t0+1, the slowed input signal S_In_delay passes above the switching threshold V_threshold of the inverter Inv1. At this same instant t0+1, the inverter Inv1 delivers at the output (Pulse_In) a low logic state. Note that the inverter Inv1 makes it possible to generate at the output 32 a pulse, called a first pulse, which is characterised by a rising edge triggered at the instant t0 by the switching of the input signal S_In, and by a falling edge triggered at the instant t0+1 by the fact that the slowed input signal S_In_delay is greater than the threshold of the inverter Inv1. At this instant t0+1, the module 1000 delivers no second pulse (Pulse_module) on the output GPIO20. The OR logic gate 40, receiving a low logic state on each of its two inputs 401 and 402, provide a low logic state on the activation input 501 of the latch 50. The latch 50 is therefore deactivated and maintains the control signal S_control at its current logic state, i.e. at the high logic state.

At the instant t0+2, the module 1000 executes a command AT+WIOW=20,1, in order to generate a rising edge on the output GPIO20, then a command AT+WIOW=20,0, in order to generate a falling edge on the output GPIO20. As such at instant t0+2, the module 1000 delivers a pulse, called a second pulse, on the output GPIO20. The OR logic gate 40, receiving a high logic state on its second input 402, provides a high logic state on the activation input 501 of the latch 50. The latch 50 is therefore activated and imposes as output 203 the preceding logic state of the signal to be memorized S_memo, i.e. the low logic state. As such at the instant t0+2, the control signal S_control switches from the high logic state to the low logic state.

At the instant t0+3, the module 1000 executes a command AT+CALA, in such a way as to program the real time clock (not shown) of the module, then a command AT+CPOF to, on the one hand, turn off the GSM stack of the module 1000 and on the other hand place the module in a mode of operation, called the alarm mode, wherein only the real time clock is active. As indicated hereinabove, this real time clock makes it possible to wake up the module at programmed instants. Note that in the alarm mode, the power consumption of the module 1000 is substantially less than 10 µA.

Of course, the invention is not limited to the example embodiments mentioned hereinabove.

In particular, those skilled in the art can modify the means for switching 20, in particular by replacing the inverter Inv2 with an XOR logic gate.

Likewise, the means for generating a pulse 30 can be implemented by any other manner, i.e. in particular with an RC circuit mounted in series with an operational amplifier mounted as a comparator.

At least one embodiment of the disclosure provides a technique for controlling the operation of a radiocommunication module which does not require the use of a microprocessor that takes up space and that is expensive in terms of electric consumption.

At least one embodiment implements such a technique that makes it possible to minimize the electric consumption of the module when it is not used.

At least one embodiment implements such a technique that is ergonomic and which suppresses the operations of manual control that must be carried out by the user in order to activate or deactivate a radiocommunication module.

At least one embodiment provides such a technique that is in particular well adapted to the radiocommunication modules of the "WISMO" (registered trademark) family.

At least one embodiment provides such a technique that is simple to implement and inexpensive.

Although examples of the invention has been described hereinabove in relation with a limited number of embodiments, those skilled in the art, when reading this description, will understand that other embodiments can be imagined without leaving the scope of this invention.

The invention claimed is:

1. A device for controlling operation of a radiocommunication electronic module by a control signal, said device comprising:
   a switching circuit having a control output for controlling the operation of the radiocommunication module and having a command input, wherein the switching circuit is configured to generate the control signal on the control output and switch a logic state of the control signal, from a logic high state to a logic low state or from the logic low state to the logic high state, once for each command signal received on the command input, and wherein said switching circuit is configured to maintain said control signal in its current logic state between successive command signals received on the command input; and
   a command circuit comprising:
   a first input receiving a first pulse representative of a change of state of a supply voltage;
   a second input receiving a second pulse coming from said module; and
   a command output coupled to the command input of the switching circuit,
   wherein the command circuit is configured to generate the command signal on the command output once for each pulse received on the first or second inputs to the command circuit; and
   means for generating the first pulse in response to the supply voltage switching from an inactive state to an active state.

2. The device according to claim 1, wherein said command circuit comprises an OR logic gate receiving said first and second signals, and delivering said command signal.

3. The device according to claim 1, wherein said switching circuit comprises:
   a latch receiving on a first latch input said command signal and delivering at a latch output said control signal; and
   a feedback, which connects the latch output to a second latch input of said latch.

4. The device according to claim 3, wherein said feedback includes an inverter.

5. The device according to claim 1, wherein the device comprises:
   a supply terminal receiving the supply voltage, which has an inactive state and an active state;
   a pulse generator having an input connected to the supply terminal and a having pulse output coupled to the first input of the command circuit, wherein the pulse generator is configured to generate the first pulse on the pulse output in response to the supply voltage switching from the inactive state to the active state.

6. The device according to claim 5, wherein said pulse generator comprises:
   means for receiving the supply voltage and in response generating a slowed signal having a slower rise time than the switch of the voltage signal from the inactive state to the active state; and
   means for comparing said slowed signal with a determined threshold, said means for comparing delivering the first pulse according to a result of the comparison.

7. The device according to claim 6, wherein the means for receiving and generating comprise an RC circuit.

8. The device according to claim 6, wherein said means for comparing include an inverter.

9. A radiocommunication device comprising a device for controlling according to claim 1.

10. An assembly comprising:
   a supply terminal receiving a supply voltage having an inactive state and an active state;
   a radiocommunication electronic module having an operation controlled by a control signal, wherein said module comprises:
   an ON/OFF activation input receiving said control signal, wherein said module is configured to turn on a software stack executed by the module when the ON/OFF activation input has a logic high state and to turn off the software stack when the ON/OFF activation input has a logic low state;
   a module output;
   means for generating a signal second pulse on the module output; and
   means for executing a set of commands, said set of commands comprising at least one AT command belonging to the group comprising:
   a command that activates said means for generating;
   a command that programs a real time clock internal to said module; and
   a command that turns off the software stack of said module;
   a pulse generator having an input connected to the supply terminal and a having pulse output, wherein the pulse generator is configured to generate a first pulse on the pulse output in response to the supply voltage switching from the inactive state to the active state;
   an activation control device, which comprises:
   a switching circuit having a command input and having a control output, which is coupled to the ON/OFF activation input of the module, wherein the switching circuit is configured to generate the control signal on the control output and switch a logic state of the control signal, from a logic high state to a logic low state or from the logic low state to the logic high state, once for each command signal received on the command input, and wherein said switching circuit is configured to maintain the control signal in its current logic state between successive command signals received on the control input; and
   a command circuit comprising:
   a first input coupled to the pulse output of the pulse generator for receiving the first pulse;
   a second input coupled to the module output for receiving said second pulse; and
   a command output coupled to the command input of the switching circuit signal, wherein the command circuit is configured to generate the command signal on the command output once for each pulse received on the first or second inputs to the command circuit.

11. The device according to claim 10, wherein said pulse generator comprises:
   means for receiving the supply voltage and in response generating a slowed signal having a slower rise time than the switch of the voltage signal from the inactive state to the active state; and means for comparing said slowed signal with a determined threshold, said means for comparing delivering the first pulse according to a result of the comparison.

12. The device according to claim 11, wherein the means for receiving and generating comprise an RC circuit.

13. The device according to claim 11, wherein said means for comparing include an inverter.

14. A device for controlling operation of a radiocommunication electronic module by a control signal, said device comprising:
   a supply terminal receiving a supply voltage having an inactive state and an active state;
   a pulse generator having an input connected to the supply terminal and a having pulse output, wherein the pulse generator is configured to generate a first pulse on the pulse output in response to the supply voltage switching from the inactive state to the active state;
   a command circuit comprising:
      a first input coupled to the pulse output of the pulse generator for the first pulse;
      a second input receiving a second pulse coming from said module; and
      a command output, wherein the command circuit is configured to generate a command signal on the command output once for each pulse received on the first or second inputs to the command circuit; and
   a switching circuit having a command input coupled to the command output of the command circuit and a control output for controlling the operation of the radiocommunication module, wherein the switching circuit is configured to generate the control signal on the control output and to switch a logic state of the control signal, from a logic high state to a logic low state or from the logic low state to the logic high state, once for each command signal received on the command input, and wherein said switching circuit is configured to maintain said control signal in its current logic state between successive command signals received on the control input.

15. The device according to claim 14, wherein said pulse generator comprises:
   means for receiving the supply voltage and in response generating a slowed signal having a slower rise time than the switch of the voltage signal from the inactive state to the active state; and
   means for comparing said slowed signal with a determined threshold, said means for comparing delivering the first pulse according to a result of the comparison.

16. The device according to claim 15, wherein said means for comparing include an inverter.

17. The device according to claim 15, wherein the means for receiving and generating comprise an RC circuit.

18. The device according to claim 15, wherein the means for receiving and generating further comprise a pull-down resistor coupled to an output of the RC circuit.

19. A device for controlling operation of a radiocommunication electronic module, said device comprising:
   means for receiving a supply voltage having an inactive state and an active state;
   means for generating a first pulse in response to the supply voltage switching from the inactive state to the active state;
   means for receiving a second pulse from the radiocommunication electronic device; and
   means for supplying an ON/OFF activation control signal to the radiocommunication module and toggling a logic state of the control signal once for each received first pulse and second pulse.

* * * * *